Figure 1:
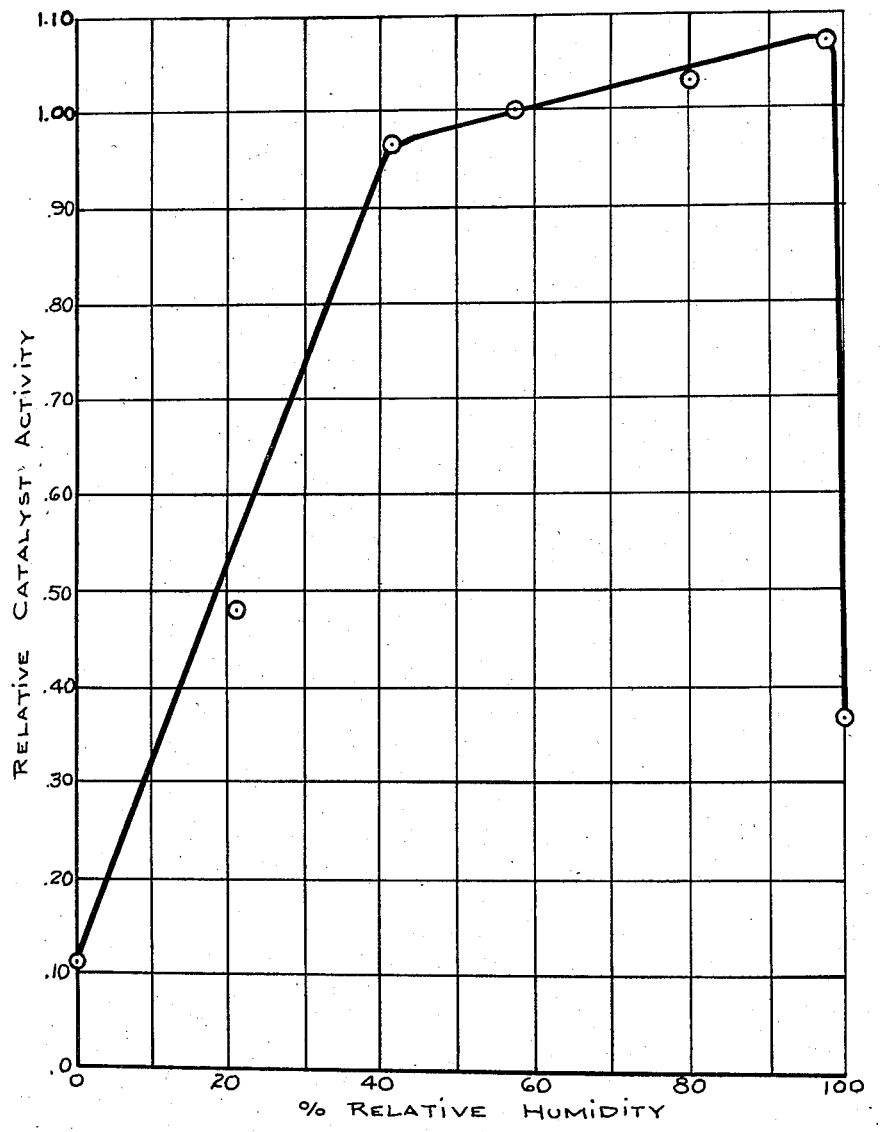

Effect of Moisture on Catalyst Activity

Jan. 6, 1959   W. S. GLEASON, JR., ET AL   2,867,507
HYDROGENATION OF ALKYLANTHRAQUINONES
Filed May 8, 1958   2 Sheets-Sheet 2

MOISTURE CONTROL IN CYCLE OPERATION

INVENTOR.
Willard S. Gleason, Jr.
Jerome W. Sprauer
BY Amos G. Cole

AGENT

United States Patent Office 2,867,507
Patented Jan. 6, 1959

2,867,507

HYDROGENATION OF ALKYLANTHRAQUINONES

Willard S. Gleason, Jr., Lewiston, N. Y., and Jerome W. Sprauer, Wilmington, Del., assignors to E. I. du Pont de Nemours and Company, Wilmington, Del., a corporation of Delaware Application May 8, 1958, Serial No. 733,988

7 Claims. (Cl. 23—207)

This invention relates to the catalytic hydrogenation of alkylanthraquinones, particularly in cyclic processes for the production of hydrogen peroxide wherein an alkylanthrahydroquinone is employed as an intermediate.

This application is a continuation-in-part of our copending application Serial No. 351,013, filed April 24, 1953, now abandoned.

Metallic palladium on an activated alumina support is a very effective catalyst for the hydrogenation stage of cyclic processes of the above type, as is disclosed in Sprauer application S. N. 125,848, filed November 5, 1949, now Patent 2,657,980. The present invention is based upon the discovery that the performance of such a catalyst, particularly its activity, is highly dependent upon the moisture content of the hydrogenator system, and that by suitably controlling the moisture content optimum catalyst performance can be achieved.

It is an object of the invention to provide an improved method for hydrogenating alkylanthraquinones. A further object is an improved method for hydrogenating alkylanthraquinones in the presence of a catalyst comprising metallic palladium on an activated alumina support. A still further object is to provide an improved method for producing hydrogen peroxide involving the cyclic hydrogenation of an alkylanthraquinone and oxygenation of the resulting alkylanthrahydroquinone to regenerate the alkylanthraquinone for recycling after separating the hydrogen peroxide simultaneously formed, in which method a catalyst comprising metallic palladium on an activated alumina support is employed in the hydrogenation stage. A particular object is to provide an improvement in the method of carrying out the hydrogenation stage of such a cyclic process, involving controlling the moisture content of the system. Still further objects will be apparent from the following description.

The above objects are accomplished in accordance with the invention by effecting the hydrogenation of an alkylanthraquinone in the presence of a catalyst comprising metallic palladium on an actviated alumina support, while maintaining the moisture content of the hydrogenator system at a value within the range corresponding to a relative humidity within the range of 40% to 98%.

It has been discovered that high activity of such a catalyst is critically dependent upon controlling the moisture content so as to be within the range indicated. Catalyst activity decreases sharply as the moisture content is varied so as to be either substantially lower or higher than the lower and higher limits, respectively, of the range indicated. Control of the moisture content so as to fall within the range corresponding to a relative humidity of 60 to 90% is preferred.

In cyclic operations using a nickel catalyst such as Raney nickel, it has been proposed that the working solution (solution of the alkylanthraquinone intermediate in a suitable organic solvent) which is to be recycled be dried sufficiently to prevent separation of a free water phase in the hydrogenator in order to prevent agglomeration of the catalyst particles. Such effect of a free water phase on an unsupported nickel catalyst is entirely unrelated to the effect of water at concentrations below saturation on the performance of the present microporous catalyst. When using the present catalyst, there is a critical range of water content, wholly below the saturation concentration, at which catalyst activity is exceptionally high whereas its activity falls off markedly at water contents either above or below the critical range. This critical range of water content is believed to be directly related to the microporous nature of the palladium-on-activated alumina catalyst and its high adsorptivity. These properties are not characteristic of the prior nickel catalyst such as Raney nickel with which mere avoidance of the formation of a separate water phase in the hydrogenator appears to be all that is necessary.

The present invention is applicable to the hydrogenation of alkylanthraquinones generally to the corresponding alkylanthrahydroquinones. Examples are the 2-methyl-, 2-ethyl-, 2-n-propyl-, 2-isopropyl-, 2-sec.-butyl-, 2-t-butyl-, 2-sec.-amyl-, 1,3-dimethyl-, 2,3-dimethyl-, 1,4-dimethyl- and 2,7-dimethyl- anthraquinones. The 2-alkylanthraquinones, particularly 2-t-butylanthraquinone whose use is disclosed in Hinegardner application S. N. 125,831, filed November 5, 1949, now Patent 2,689,169 constitute a preferred class. Since it is generally known that the tetrahydro derivatives of these alkylanthraquinones function in cyclic processes of the type mentioned above in the same manner as do the parent compounds, the term "alkylanthraquinone" is employed herein to include such tetrahydro derivatives. Thus, tetrahydro-2-t-butylanthraquinone hydrogenates to yield the corresponding anthrahydroquinone which upon oxygenation reforms tetrahydro-2-t-butylanthraquinone along with hydrogen peroxide. In any cyclic system of the above type in which an alkylanthraquinone is employed as the intermediate, repeated cyclic operations generally result in the slow hydrogenation of one ring of the intermediate to form the tetrahydro derivative in substantial amounts. Accordingly, any such system after repeated use will usually contain both the alkylanthraquinone and its tetrahydro derivative, both of which are useful intermediates in the production of hydrogen peroxide.

The water concentration of the working solution in the hydrogenator could be defined in terms of the water concentration in any one of the three phases present, i. e., the solution phase, the solid catalyst phase, and the gas phase. This is because in continuous systems of the type involved operating conditions are purposely maintained as constant as possible, under which conditions the three phases are in approximate equilibria and the water content of one phase fixes the water content of the other two phases. In such continuous systems, fresh catalyst is added and spent catalyst is removed as required to maintain the rate of hydrogenation substantially constant while the working solution is fed to and removed from the hydrogenator at substantially constant rates. For present purposes, the water content is expressed in terms of the relative humidity of the gas phase since relative humidities are readily measured and readily controlled by well-known and obvious methods. The relative humidity of the gas phase is the ratio of the partial pressure of water in the gas phase to the saturation vapor pressure of water therein at a given temperature. The relative humidity of the gas phase is approximately equal numerically to the actual water concentration in the solution phase divided by the saturation concentration of water for the solution. As indicated, the relative humidity of the gas phase determines the adsorbed water content of the catalyst.

The effect of water content on the activity of a catalyst comprising metallic palladium supported on activated alumina in the hydrogenation of a working solution containing, by weight, 20% 2-t-butylanthraquinone, 52% commercial methylnaphthalene and 28% diisobutylcarbinol, is shown by the curve of the graph of Figure 1 in which the relative humidities of the gas phase are plotted against relative activities of the catalyst.

The catalyst employed in the hydrogenations on which the graph of Figure 1 is based was prepared as follows: 400 g. of 100–200 mesh gamma-alumina was suspended in 800 g. of water and the suspension heated to about 75° C. While agitating the suspension there was added a solution of 4 g. palladous chloride in 160 ml. water which solution also contained 1.6 ml. of concentrated hydrochloric acid. While still stirring the mixture, 4 ml. of 37% formaldehyde solution (to reduce the palladium salt) was added. Then after several minutes and with only occasional stirring while maintaining the solution at 70–80° C. there was added 500 ml. of a 5% sodium bicarbonate solution. The mixture was maintained at this temperature for about 10 minutes with occasional stirring. Then 8 ml. of 35% aqueous $H_2O_2$ was added with stirring and the catalyst particles were filtered out, washed with water and dried in a shallow layer in air at about 105° C. for 24 hours. The final material contained about 0.60% Pd by weight.

To obtain the results represented by the curve of Figure 1, the hydrogenations were carried out under approximately equilibrium conditions employing hydrogen at the relative humidities indicated in the table below. In each hydrogenation run, 1.00 g. of dry catalyst prepared as described above was charged with 300 ml. of the above working solution to a reactor agitated by a gas stream rising from a coarse frit 10 mm. in diameter positioned near the bottom of the reactor. Water was circulated through the reactor jacket to maintain the temperature of the working solution at 35–36° C. The relative humidity of the incoming gas at the hydrogenator temperature was controlled by equilibrium contact with pure water at a temperature controlled to obtain the desired partial pressure of water. The working solution with catalyst in the hydrogenator was first agitated with nitrogen containing water vapor at the desired relative humidity for about 30 minutes at about one liter of nitrogen per minute. This was sufficient to establish approximate equilibria of water between the three phases, i. e., the incoming gas, the working solution and the catalyst. The incoming gas was then switched from nitrogen to hydrogen at 1.5 liters per minute with the same controlled relatively humidity. The rate of hydrogenation in each run was observed by periodic analysis of the working solution to determine the extent of the conversion to 2-t-butylanthrahydroquinone.

The results of the series of runs are shown in the following table and are plotted in the graph of Figure 1.

Table

| Percent relative humidity | Relative catalyst activity |
|---|---|
| 0 | 0.11 |
| 21 | 0.48 |
| 42 | 0.96 |
| 58 | 1.00 |
| 80 | 1.03 |
| 98 | 1.07 |
| 100 | 0.37 |

It is evident from the above data that the water content of the hydrogenator system has a very great effect upon the activity of the catalyst and that the catalyst is outstandingly active at water contents within the range corresponding to a relative humidity range of 40 to 98%. The results also show that catalyst activity decreases very rapidly as the relative humidity is either decreased substantially below 40% or increased above 98%. Control of the water content of the system so as to be within a range corresponding to a relative humidity range of about 40% to 98% is, therefore, of high practical importance.

Although the water content of the catalyst is a function of the relative humidity, the approach to equilibrium conditions has been found to be extremely slow when made from the wet side. For this reason it is preferred to operate the hydrogenator at a relative humidity not greater than 90%, e. g., 60 to 90%, since at higher relative humidities slight fluctuations in temperature, pressure differences in the reactor, or minor inaccuracies in humidity measurements, could result in an inadvertent increase in the water content to above that corresponding to a relative humidity of 98% with consequent rapid decrease in catalyst activity. Catalyst activity is least sensitive to changes in relative humidity at values within the range of about 60 to 90%, hence operation within this range is generally preferred.

Also because of the slow approach to equilibrium in the working solution from the wet side, it is preferred to avoid the use of catalyst which initially contains free water as distinct from absorbed water. Most preferably, the fresh catalyst will have been dried prior to use to a water content not exceeding that corresponding to a relative humidity of 60% at the temperature of the hydrogenator. Complete drying of the catalyst prior to its introduction into the system appears to have no adverse effect.

The invention will most generally be practiced as part of a cyclic process for producing hydrogen peroxide. In such a process, the working solution of the alkylanthraquinone is hydrogenated in the presence of the palladium-on-activated alumina catalyst, the reduced solution free of the catalyst is oxidized to reform the alkylanthraquinone and simultaneously produce hydrogen peroxide, the hydrogen peroxide is separated from the working solution, e. g., by extraction with water, the residual working solution is recycled to the hydrogenation stage, and the cycle is repeated continuously.

When the hydrogen peroxide is separated by extraction with water, the residual working solution will, of course, be saturated with water at the extraction temperature, and it generally will also contain a small amount of hydrogen peroxide. Since water is usually substantially more soluble in the oxidized than in the reduced working solution, and since any residual hydrogen peroxide present in the latter will be converted to water in the hydrogenator, a free water phase will separate in the hydrogenator when hydrogenation and extraction are effected at about the same temperature unless preventive measures are taken. Such measures must also assure that the water content of the system in the hydrogenator will be below the saturation concentration, i. e., not greater than 98% of saturation, but not so low as to be outside the critical range of 40 to 98% saturation.

An example of a working solution suitable for use in the cyclic process is a solution of 2-t-butylanthraquinone, at a concentration of 175 g. per liter, in a 60:40 mixture (by volume) of diisobutylcarbinol and α-methylnaphthalene. The solubility of water in the oxidized form of such a solution is about 0.9% at 30° C. but is only about 0.6% in the reduced solution at the same temperature.

One method of practicing the invention in cyclic operations using such a working solution is to subject the solution between the extraction and hydrogenation stages of the cycle to controlled partial drying so as to leave in the solution as it enters the hydrogenator an amount of water corresponding to 40 to 98% of the saturation concentration of water in the reduced solution. Since any residual hydrogen peroxide present in the recycle solution will be converted to water in the hydrogenator (1 mole of hydrogen peroxide will form 2 moles of water), the partial drying operation should be controlled so as to compensate for any water so formed.

Figure 2:
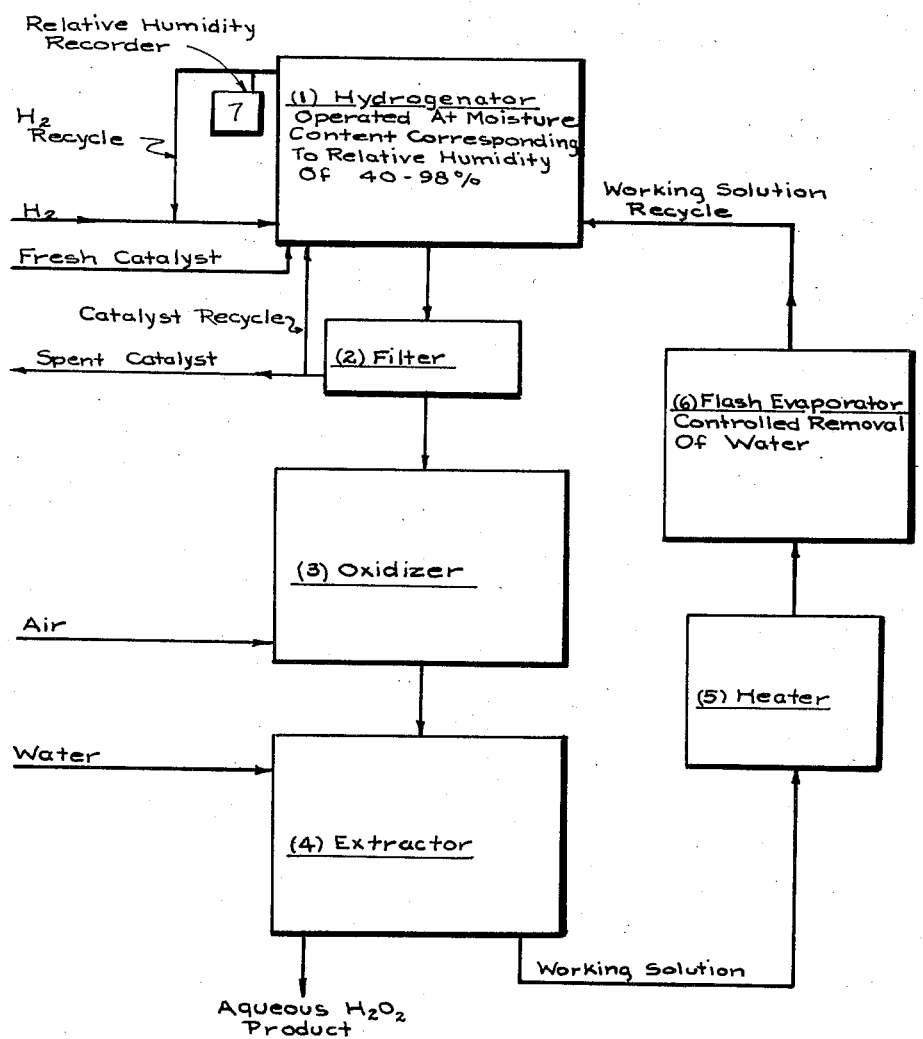

Fig. 2 shows a flow diagram in block form of a cyclic operation embodying the moisture control feature of the invention. The diagram, which is believed to be self-explanatory, shows the usual cyclic flow of working solution through a hydrogenator 1 where the alkylanthraquinone is catalytically reduced to the alkylanthrahydroquinone with recycling of unused hydrogen together with make-up hydrogen; a filter 2 (or centrifuge) to separate catalyst with recycling of most of the separated catalyst to the hydrogenator; and oxidizer 3 where the alkylanthrahydroquinone is reconverted by oxygen, air or any suitable gas containing molecular oxygen to the alkylanthraquinone, and hydrogen peroxide is simultaneously produced; an extractor 4 where the hydrogen peroxide is extracted by means of water and from whence the residual working solution, after separation of the aqueous hydrogen peroxide product extract, is recycled to the hydrogenator. As shown in Fig. 2, the working solution from extractor 4 is passed in sequence through a heater 5 and a flash evaporator 6 before being recycled to hydrogenator 4. Evaporator 6 is operated under vacuum and heater 5 should heat the working solution to such a temperature that the desired amount of water will be removed during the subsequent passage of the heated solution through flash evaporator 6. At constant flow of the working solution, the amount of water removed will depend upon the temperature to which the solution is heated in heater 5 and the pressure in evaporator 6. The heat input to heater 5 and the pressure in evaporator 6 can be readily correlated to the relative humidity of the unused hydrogen leaving hydrogenator 1, as shown by a relative humidity recorder 7 positioned in the hydrogen stream leaving the hydrogenator.

In place of the heater 5 and flash evaporator 6 indicated in Fig. 2, the working solution being recycled to hydrogenator 1 can be partially dried as desired by using suitable chemical drying agents. Also, moisture control in the hydrogenator can be achieved in part by drying the hydrogen recycle stream, and by controlling the dryness of fresh hydrogen and fresh catalyst fed to the hydrogenator. Obviously, any procedure which will effectively control the water content of the system in the hydrogenator so as to correspond to a relative humidity of 40 to 98% can be used.

A cyclic operation was carried out as generally indicated by Fig. 2 employing a working solution containing, by weight, 20% 2-t-butylanthraquinone, 28% diisobutylcarbinol and 52% α-methylnaphthalene. The operation was continued for a period of 2.5 months. The working solution fed to heater 5 was saturated with water and contained about 0.2 g. $H_2O_2$ per liter. During the operations, the solution was heated to about 45° C. in heater 5 and evaporator 6 was maintained under reduced pressure corresponding to an absolute pressure of 40 to 50 mm. Hg. Under such conditions, sufficient water was evaporated from the recycle solution in evaporator 6 to maintain the relative humidity in hydrogenator 1 at about 75%, as measured by relative humidity recorder 7.

In the above operations, hydrogenation proceeded uniformly and smoothly and the desired alkylanthrahydroquinone concentration in the solution from the hydrogenator was readily held constant by periodic small additions of fresh catalyst and withdrawals of spent catalyst at uniform rates. The rate of production of hydrogen peroxide was also uniform and the consumption of catalyst per unit of hydrogen peroxide produced was relatively low. Such smooth operation and relatively low catalyst consumption were not obtainable when the system was operated without controlling the relative humidity in the hydrogenator in accordance with the invention.

The reason for the high catalyst activity at water contents corresponding to relative humidities in the range 40 to 98% is not definitely known. It is believed, however, that the catalyst, with or without the presence of working solution, requires an amount of water corresponding to a relative humidity of the order of 40% to complete an adsorbed water monolayer. Such a monolayer facilitates intragranular diffusion of the substrate in the catalyst whereby the entire surface area of the catalyst, including internal pore surface areas is more or less effective. In contrast, it is believed that catalytic activity in a dry system is markedly lower since it would be restricted chiefly to the more readily accessible, localized outer zone of the catalyst granule. This is because the alkylanthraquinone cannot diffuse readily through the catalyst pores due to strong adsorption thereof and of solvent constituents. On the other hand, the pore volume of catalyst containing more water than that corresponding to a relative humidity of 98%, e. g., catalyst containing free water, is believed to be filled with water so that the interior of the catalyst granule is again effectively blocked. This hypothesis would account for the harmful effects of over drying or over wetting the catalyst. Moreover, it seems reasonable that water is not readily emptied from catalyst pores unless drying is effected at a relative humidity below that required to complete the formation of a monolayer of adsorbed water, which possibly explains the slow approach to equilibrium with over-wetted catalyst.

The invention is applicable to hydrogenations of the type indicated employing any catalyst comprising metallic palladium on any support material containing activated alumina in a predominating amount, i. e., at least 50% by weight. By "activated alumina" is meant any natural or synthetic hydrated alumina which has been dehydrated or partially dehydrated by heating in known manner, for example at 300–800° C., whereby a microporous alumina is obtained. Usually, the activated alumina will contain a predominant amount of alpha-alumina monohydrate, gamma-alumina, or both. Activated aluminas are well known and available commercially. In contrast with the activated aluminas is the alumina known as Corundum, which is not microporous and is unsuitable as the support for palladium in preparing catalysts for the present purpose.

Methods for preparing the present catalysts are well known. Generally they will involve impregnating granules of the activated alumina support with a solution of a palladium compound, e. g. palladous chloride or chloropalladous acid, and then reducing the impregnated compound to metallic palladium. Suitable reducing agents are formaldehyde and hydrogen. Catalysts containing from about 0.01 to 10%, preferably 0.1 to 2%, by weight of metallic palladium are generally useful for the present purpose.

The hydrogenation and oxygenation phases of the cyclic process can be carried out under any conditions previously known to be suitable, it being only necessary to control the moisture content in the hydrogenator system as specified above in order to realize improved catalyst activity in accordance with this invention. In general, hydrogen pressures of from about 0.4 to 3, preferably 0.5 to 0.9, atmospheres; and, temperatures of about 20 to 50° C., preferably 30 to 40° C., will be used.

We claim:

1. In a process for producing hydrogen peroxide involving alternately hydrogenating an alkylanthraquinone and oxygenating the resulting alkylanthrahydroquinone to regenerate said alkylanthraquinone and simultaneously produce hydrogen peroxide, the improvement comprising effecting said hydrogenation in the presence of a catalyst comprising metallic palladium on an activated alumina support while maintaining the water content of the hydrogenator system at a value within the range corresponding to a relative humidity range of 40 to 98%.

2. The method of claim 1 wherein the water content is maintained at a value within the range corresponding to a relative humidity range of 60 to 90%.

3. The method of hydrogenating an alkylanthraquinone to an alkylanthrahydroquinone comprising effecting said hydrogenation in the presence of a catalyst comprising metallic palladium on an activated alumina support while maintaining the water content of the hydrogenator system at a value within the range corresponding to a relative humidity range of 40 to 98%.

4. The method of claim 3 wherein the water content is maintained at a value within the range corresponding to a relative humidity range of 60 to 90%.

5. The method of claim 3 wherein an alkylanthraquinone solution to be hydrogenated is continuously fed to the hydrogenator system, hydrogenated solution is continuously removed from the system, and wherein fresh catalyst is added and spent catalyst is removed from the system as required to maintain hydrogenation at a substantially constant rate.

6. The method of claim 5 wherein the catalyst added to the system has been predried to a water content corresponding to a relative humidity not exceeding 60% at the temperature of the hydrogenator.

7. The method of claim 3 wherein the hydrogenation is effected at a temperature within the range of 20 to 50° C.

References Cited in the file of this patent

UNITED STATES PATENTS

| | | |
|---|---|---|
| 2,369,912 | Pfleiderer et al. | Feb. 20, 1945 |
| 2,657,980 | Sprauer | Nov. 3, 1953 |